United States Patent
Bach et al.

(10) Patent No.: US 8,413,485 B2
(45) Date of Patent: Apr. 9, 2013

(54) DETECTION METHOD AND DETECTION DEVICE FOR DETECTING CORE DEFECTS AND DELAMINATIONS IN SANDWICH STRUCTURES

(75) Inventors: Martin Bach, Bremen (DE); Axel Herrmann, Stade (DE); Pierre Zahlen, Stade (DE)

(73) Assignee: Airbus Operations GmbH, Hamburg (DE)

( * ) Notice: Subject to any disclaimer, the term of this patent is extended or adjusted under 35 U.S.C. 154(b) by 278 days.

(21) Appl. No.: 12/837,722

(22) Filed: Jul. 16, 2010

(65) Prior Publication Data

US 2011/0036149 A1    Feb. 17, 2011

Related U.S. Application Data

(60) Provisional application No. 61/226,472, filed on Jul. 17, 2009.

(51) Int. Cl.
*G01M 3/02* (2006.01)
*G01M 3/04* (2006.01)

(52) U.S. Cl. ............................. 73/37; 73/40.7
(58) Field of Classification Search .............. 73/37, 40.7
See application file for complete search history.

(56) References Cited

U.S. PATENT DOCUMENTS

| | | | | |
|---|---|---|---|---|
| 5,770,794 A | * | 6/1998 | Davey | 73/37 |
| 5,780,721 A | | 7/1998 | Levens | |
| 2002/0029614 A1 | * | 3/2002 | Davey | 73/37 |
| 2002/0038568 A1 | * | 4/2002 | Davey | 73/38 |
| 2009/0113994 A1 | * | 5/2009 | Walker et al. | 73/40 |

FOREIGN PATENT DOCUMENTS

| | | |
|---|---|---|
| DE | 69419608 | 3/2000 |
| DE | 100 56 377 A1 | 5/2002 |
| DE | 102007014160 A1 | 9/2008 |

* cited by examiner

*Primary Examiner* — Hezron E Williams
*Assistant Examiner* — David Z Huang
(74) *Attorney, Agent, or Firm* — Occhiuti Rohlicek & Tsao LLP

(57) ABSTRACT

The present invention relates to a method for detecting a defective sandwich component, particularly in aircraft construction, the method comprising the following steps: forming at least one measuring chamber in a core arrangement of a sandwich component, said at least one measuring chamber having an outwardly open end; subjecting the at least one measuring chamber to a predetermined pressure; and detecting and evaluating the pressure forming in the at least one measuring chamber.

12 Claims, 4 Drawing Sheets

DETECTION METHOD AND DETECTION DEVICE FOR DETECTING CORE DEFECTS AND DELAMINATIONS IN SANDWICH STRUCTURES

CROSS-REFERENCE TO RELATED APPLICATIONS

This application claims the benefit of U.S. Provisional Application No. 61/226,472, filed Jul. 17, 2009, the entire disclosure of which is herein incorporated by reference.

FIELD OF THE INVENTION

The present invention relates to a detection method and a detection device for detecting or determining core defects, in particular foam core defects, and delaminations in sandwich structures, with particular regard to sandwich structures in aircraft construction.

A sandwich structure is known from the prior art, as described for example in DE 2 302 989. In this case, the sandwich structure consists of an outer layer and an inner layer with a core positioned in between. The inner and outer layers can consist of metal or glass fibre or carbon fibre composite materials. Furthermore, for example a honeycomb structure or a plastics material foam consisting of materials such as polyurethane, polyvinylchloride or polyurethane acrylamide is used as the core.

However, the foamed material core is liable to fracture in a sandwich structure of this type. Furthermore, delamination or debonding can occur between the respective cover layer and the foamed material core.

Hitherto, the prior art has not provided a method for detecting fractures of this type in the core of a sandwich structure or for determining a debonding or delamination between the core and a cover layer of the sandwich structure.

SUMMARY OF THE INVENTION

Therefore, the object of the invention is to provide a method and a device in which defects in a sandwich structure can be detected.

This object is achieved according to the invention by a method which has the features according to claim 1 or by a device which has the features according to claim 7 and by a sandwich component with the features according to claim 12.

One aspect of the present invention relates to the method for detecting a defective sandwich component, the method comprising the following steps: forming at least one measuring chamber in a core arrangement of a sandwich component, the at least one measuring chamber having a closed end and another outwardly open end; connecting a detection device with the open end of the measuring chamber; subjecting the at least one measuring chamber with a predetermined pressure by means of the detection device; and detecting and evaluating the pressure which forms in the at least one measuring chamber by means of the detection device.

A further aspect of the present invention relates to the device for detecting a defective sandwich component, particularly in aircraft construction. The device comprises a detection device which comprises: a pump means for producing a predetermined pressure in at least one measuring chamber of a core arrangement of the sandwich component, wherein the pump means can be connected to an outwardly open end of the at least one measuring chamber, and wherein the other end of the measuring chamber is closed; and a measuring system for detecting and evaluating the pressure which has formed in the at least one measuring chamber.

Another aspect of the present invention relates to the sandwich component, said sandwich component having at least a first and a second cover layer, between which a core arrangement is provided, at least one measuring chamber being configured in the core arrangement to determine damage to the sandwich component and the at least one measuring chamber having an outwardly open end and another closed end for connecting a detection device thereto.

The intended introduction of measuring chambers, for example air measuring chambers, into the sandwich structure and the production of a predetermined pressure in a measuring chamber, as well as the determination whether this pressure forms in the measuring chamber or whether a pressure compensation results due to a damaged area allows a very simple and reliable determination of damaged areas in sandwich structures which have, for example, a foam core or a honeycomb core. Hitherto, this has been impossible in the prior art.

Advantageous embodiments and developments of the invention are provided in the subclaims and in the description with reference to the drawings.

BRIEF DESCRIPTION OF THE DRAWINGS

In the following, the invention will be described in detail on the basis of embodiments with reference to the accompanying figures.

DESCRIPTION OF EXEMPLARY EMBODIMENTS

Figure 1:
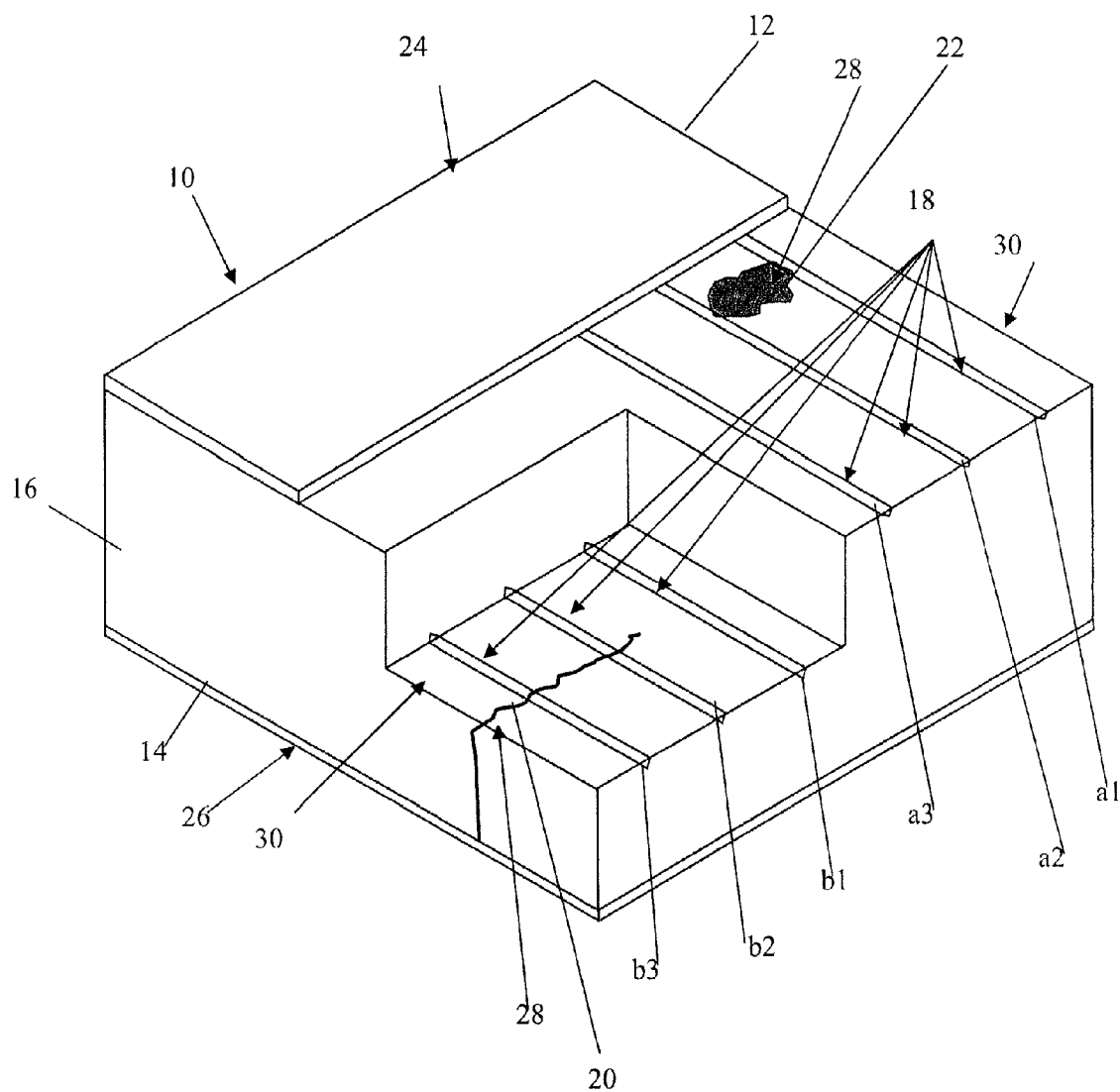
FIG. 1 is a perspective view of a sandwich structure, said sandwich structure being provided with air measuring chambers in the form of channels which are arranged in two planes parallel to a cover layer according to an embodiment of the invention.

In the figures, the same reference numerals denote the same or functionally identical components, unless indicated otherwise.

FIG. 1 is a perspective view of an exemplary sandwich structure 10, as can be used for example in the aerospace sector, in particular in aircraft construction or for commercial aircraft or transport aircraft.

A sandwich structure 10 or a sandwich component is generally composed of a plurality of firmly interconnected layers 12, 14, 16. The cover layers 12, 14 or skins, such as face sheets, cover plates or planking can consist of, for example, metal, fibre-reinforced plastics material, for example CFRP, GFRP, ARC, GLARE etc., and/or hard paper etc. or can comprise these materials. The core material used for the core arrangement 16 includes, for example, paper, fibre-reinforced plastics materials, plastics material foams, metal foams, metals such as aluminium, steel or titanium and/or metal alloys, in the form of plates, profiles, honeycombs and/or foams, to name but a few examples.

The sandwich structure 10, as shown in FIG. 1, has for example a first layer, more specifically here the upper cover layer 12 and a second layer, more specifically here the lower cover layer 14. In the present example, both cover layers 12, 14 are made of CFRP. Provided between these two layers 12, 14 or cover layers is a core arrangement 16, said core arrangement 16 having in the present example a foam core which consists of at least one layer of foamed material, for example a plastics material foam and/or a metal foam, the foamed material preferably being closed-pore or substantially closed-pore. In principle, the foam core can also have two, three and more layers of foamed material, in which case the layers can consist of the same or a different foamed material. This applies to all embodiments of the invention.

The two cover layers 12, 14 are attached to the core arrangement 16, for example by an adhesive. However, in principle it is possible for any other form of attachment or attachment means to be provided which is capable of joining the two cover layers 12, 14 to the core arrangement 16. In principle, an additionally so-called cover layer (not shown) can also selectively be provided on one or both sides of the sandwich structure 10, so that, for example, the entire core arrangement is closed on all sides or at least on two or three sides by a cover layer.

In the present example in FIG. 1, the core arrangement 16 is bonded for example to one or both cover layers 12, 14. One or both cover layers 12, 14 can consist of a metal or of a metal alloy, at least one fibre-reinforced plastics material, for example CFRP, GFRP, ARC, GLARE etc., and/or hard paper, such as Nomex or can comprise these materials. Furthermore, the cover layers 12, 14 can consist of the same material or the same material combination or can consist of a different material or of a different material combination. The invention is not restricted to the previously mentioned materials for the core arrangement 16 and the cover layers 12, 14. The specified materials are merely examples. This applies to all embodiments of the invention.

The invention comprises a method and a device for detecting or determining defects or damage occurring in a sandwich component 10, in particular fractures or cracks in the core arrangement 16 of the sandwich construction 10, as well as the detection of a debonding or delamination between the core arrangement 16 and the cover material 12, 14. The method and device can be used for example within the framework of so-called "Structural Health Monitoring" (SHM) in aircraft operation. More precisely, a sandwich component can be examined within a short period of time for possible defects, for example fractures or debondings or delaminations, i.e. during the flight of an aircraft (online) or on the ground (offline). During an inspection, for example during operation of the aircraft in the course of a flight (online) or when the aircraft is on the ground, for example in a parked position in the airport (offline), the aircraft or more specifically the sandwich component(s) of which to be inspected are provided with a measuring system, and optionally also an evaluation means for subsequently evaluating the measurement results. This has the advantage that the sandwich component can be examined in a short time and the results can be evaluated, for example immediately afterwards on board. For an offline inspection, an aircraft which is on the ground can be inspected, and in this case the sandwich component to be respectively examined is connected to a measuring system and an evaluation means on the ground and is examined. In this case, the examination of sandwich components can be carried out, for example in the course of a maintenance procedure or inspection or even when the aircraft is in a parked position in the airport, for example.

The method and device according to the invention substantially comprise the integration of one or more air measuring chambers 18 into a core arrangement 16, for example a core arrangement with a honeycomb structure and/or a core arrangement with a foam core, for example a closed-pore and/or an open-pore foam core, for detecting defects or damage, for example fractures or cracks 20 in the core arrangement 16, porosities and/or debonding 22 or delaminations between the respective cover layer 12, 14 and the core arrangement 16 or, for example, interconnected layers of the core arrangement if they consist, for example, of at least two interconnected foamed material layers and/or honeycomb structure layers.

According to the method of the invention, in a first step S1 at least one, two, three and more air measuring chambers 18 are initially introduced into the core arrangement 16, in this case into the foam core in FIG. 1, of the sandwich component 10 to be examined. The air measuring chambers 18 are preferably closed at one end and open to the surroundings at the other end such that, for example, the measuring system can be connected thereto.

These air measuring chambers 18 can be introduced into the core arrangement 16, for example at least a foam core and/or honeycomb core, for example by introducing for example a heatable element, for example an electrically heatable wire or an electrically heatable tube or small tube, by drilling, milling, etching and/or melting, for example melting using a laser or a chemical agent (an acid or a solvent, for example methylethylketone (MEK), etc.), or by inserting suitable profiled parts, for example small tubes or rods etc. (for example Teflon-coated profiled parts) and subsequently removing them. For example, in the production of a foam core as the core arrangement, at least one or a plurality of profiled parts, for example small tubes, rods etc., can be inserted, for example before or during foaming of the foam core and subsequently removed from the finished foam core to form the respective measuring chambers or air measuring chambers in the foam core. The shape of the profiled parts can be varied as desired, depending on function and purpose of use. Furthermore, the profiled parts can also be optionally coated, for example with Teflon, to facilitate their removal from the core arrangement. The profiled parts can also be rigid or resilient and/or flexible such that they can also be arranged, for example, in spiral form or in wave form in the foam core and can then be easily removed as they are flexible and/or resilient.

The invention is not restricted to the aforementioned examples for introducing air measuring chambers 18 into the core arrangement 16. In principle, any other method or means can be used which is capable of forming air measuring chambers 18 in the core arrangement 16, for example capable of forming air measuring chambers 18 in a foam core and/or a honeycomb core.

The air measuring chambers 18 can be introduced into the core arrangement 16, for example depending on efficiency, at least one or more, for example various points in the production chain of a sandwich structure. More precisely, for example one or more air measuring chambers 18 can be introduced into the finished sandwich component 10. In this respect, air measuring chambers 18 can be formed vertically, for example to a cover layer 12, 14, in the core arrangement 16. Likewise, during production of the sandwich component 10, the air measuring chambers 18, for example air measuring chambers 18 parallel to the subsequently applied cover layer 12, 14 can be introduced into the core arrangement 16 and the core arrangement 16 can subsequently be provided with the two cover layers 12, 14. In this respect, the core arrangement 16 can be produced previously with the corresponding air measuring chambers 18 or with at least some of the air measuring chambers 18. Alternatively, additional air measuring chambers 18 can be introduced into the sandwich component 10 which is finished at a later stage, as previously described.

As previously described, the air measuring chambers 18 can be produced for example by heatable or hot elements, by drilling, melting (melting using a chemical material or by a laser etc.), milling, etching and/or by laser beam. The production time and the type of processing depend, inter alia, on the position of the measuring chambers 18 in the core arrangement 16. Thus, air measuring chambers 18 which run orthogonally to a cover layer 12, 14 are only introduced when the sandwich component 10 is finished, for example, as described above.

A central position, for example, in the core arrangement 16, more precisely here in the foam core is appropriate for monitoring the structure in respect of defects, for example core fracture or cracks 20 in the core arrangement 16. If at least some or all of the measuring chambers 18 are introduced in the upper side 24 and/or in the lower side 26 of the core arrangement 16, the structure can also be examined for delamination 22 (debonding) or delaminations between the respective cover layer 12, 14 and the core arrangement 16.

The monitoring method can basically be carried out in two different ways.

In the first embodiment, in a second step S2 at least one air measuring chamber 18, for example measuring chamber a2 in FIG. 1, is put under a higher pressure than the ambient pressure $P_{ambient}$. In other words, a measuring system pumps air and/or another gaseous medium into air measuring chamber a2. The following relationship applies: $P_{measuring\ chamber-a2} > P_{ambient}$. The pressure $P_{measuring\ chamber-a2}$ in measuring chamber a2 is for example slightly higher than the ambient pressure $P_{ambient}$ and is in a range of for example:

$0\ bar < P_{measuring\ chamber-a2} \leq 1\ bar.$

However, the measuring chamber pressure can also be selected to be greater than 1 bar, depending, for example on the thickness of the core arrangement 16.

If the air measuring chamber 18 runs in a region of the core arrangement 16 which is not damaged, the higher measuring chamber pressure $P_{measuring\ chamber-a2}$ in air measuring chamber a2 can be maintained or at least substantially maintained. Otherwise, a damaged area 28 is in the region of air measuring chamber a2, as will be described in more detail in the following with reference to the examples in FIGS. 1 and 2.

In a second embodiment, in an alternative second step S2*, a measuring system produces a low pressure or a defined low pressure instead of an excess pressure in at least one air measuring chamber 18, here for example in air measuring chamber a2. This means that the pressure $P_{measuring\ chamber-a2}$ in measuring chamber a2 is consequently lower than the ambient pressure $P_{ambient}$ or $P_{measuring\ chamber-a2} < P_{ambient}$.

If the air measuring chamber 18, here air measuring chamber a2, runs in a region of the core arrangement 16 which is not damaged, the higher measuring chamber pressure $P_{measuring\ chamber-a2}$ in air measuring chamber a2 can be maintained or at least substantially maintained. Otherwise, as already explained, a damaged area 28 is in the region of air measuring chamber a2, as will be described in more detail further below with reference to FIGS. 1 and 2.

To sum up, according to both embodiments, a pressure $P_{measuring\ chamber}$ is produced or provided in the respective air measuring chamber 18 in step S2 or S2*, which pressure $P_{measuring\ chamber}$ is not the same as the ambient pressure $P_{ambient}$, i.e. it is less than or more than the ambient pressure $P_{ambient}$ or is not the same as ambient pressure $P_{ambient}$, so that $P_{measuring\ chamber} \neq P_{ambient}$. The mode of operation is the same in each case.

Figure 2:
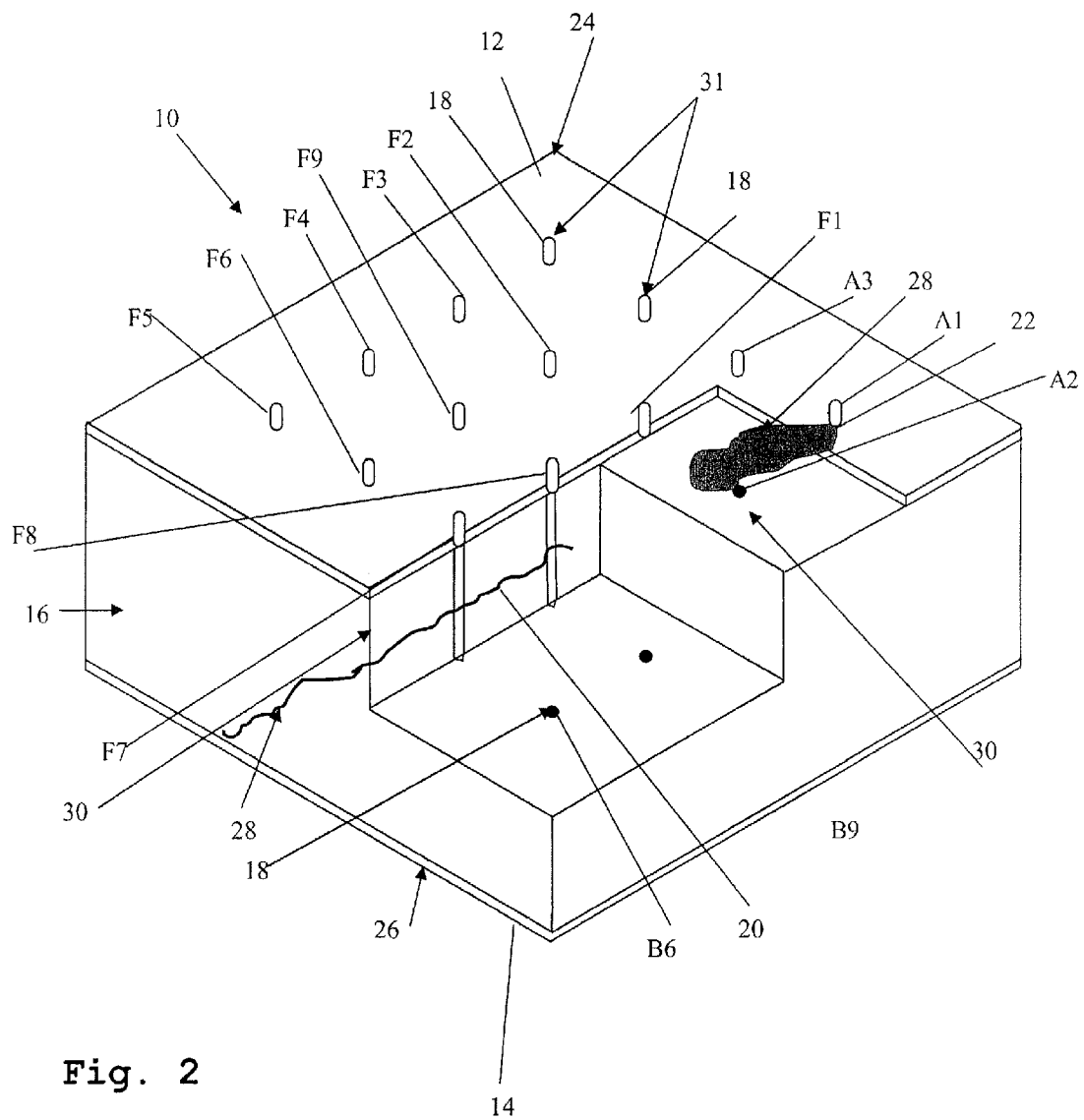
FIG. 2 is a perspective view of a sandwich structure, said sandwich structure being provided with air measuring chambers in the form of channels which are arranged in a plurality of planes orthogonally to a cover layer according to an embodiment of the invention.

In step S2, the pressure in the respective measuring chamber 18 is detected by the measuring system and in step S3 is evaluated by an evaluation means. For this purpose, the air measuring chambers 18 to be measured can be provided with a respective connection 31 for the measuring means, for example in the form of a small tube or a sleeve, as shown in FIGS. 1 and 2, to simplify the connection of the measuring means. However, a connection 31 of this type is not absolutely necessary.

In the example of FIG. 1, the air measuring chambers a1, a2 and a3 are provided under the cover layer 12 in the core arrangement 16 such that, in addition to detecting cracks 20 in the core arrangement 16, it is also possible to detect, for example, debonding 22 or delaminations between the cover layer 12 and the core arrangement 16. In the case of the core arrangement 16 in FIG. 1, a defect or a damaged area 28 occurs in the form of a delamination 22 between the cover layer 12 and the core arrangement 16. In this respect, the air measuring chambers a1 and a2 lead through these delaminations 22 or the air channels a1 and a2 are interconnected by the delamination area 22.

The result of this is that when, for example, air is pumped out by the measuring system in air measuring chamber a2 in order to achieve a lower pressure $P_{measuring\ chamber-a2}$ than the ambient pressure $P_{ambient}$ or a defined low pressure in the air measuring chamber a2 and x to also optionally maintain it, a pressure compensation results via the air channel a1 which is connected to the air channel a2 by the delamination area 22. In other words, air is suctioned into the air measuring chamber a2 by the air channel a1 and the delamination area 22. The measuring system is then able to establish that a predetermined low pressure $P_{measuring\ chamber-a2}$ has not been produced in the air measuring chamber a2, but that there has been a pressure compensation with the surroundings and the pressure in the air measuring chamber 18 is substantially the same as the ambient pressure or $P_{measuring\ chamber-a2} \approx P_{ambient}$.

In this manner, it is then possible in a step S3 to establish by an evaluation means that there is some damage or a debonding area (delamination area) between the air measuring chambers a1, a2 and a3. To then determine whether the delamination area 22 is between the two adjacent air measuring chambers a1 and a2 or a2 and a3, air is then, for example, suctioned out of air measuring chamber a3 by the measuring system to produce a low pressure in air measuring chamber a3. Since air measuring chamber a3 is located in an intact region of the sandwich component 10 into which the delamination area 22 does not extend, the measuring system can establish that the low pressure can be set in air measuring chamber a3. Thus without a further measurement of air channel a2, the evaluation means can establish that the delamination area 22 extends in the region between the two air measuring chambers a1 and a2, but does not reach as far as air measuring chamber a3.

In the example of FIG. 1, in addition to a plurality of air measuring chambers a1, a2 and a3 in the core arrangement 16 under the cover layer 12, a plurality of air measuring chambers b1, b2 and b3 is further provided, for example in the centre of the core arrangement 16. As shown in FIG. 1, the air measuring chambers 18 can be arranged, for example, in at least one or two planes 30. In the present case, the air measuring chambers 18 are arranged in both planes 30 parallel to cover layer 12 or 14 and they form a grid.

To determine defects such as cracks 20, porosities and debondings 22 or delaminations, etc., the air measuring chambers 18 are preferably arranged relative to one another such that they do not intersect. However, in principle the air measuring chambers 18 can also be arranged such that they do intersect. In this case, to measure a first air measuring chamber which is intersected by another second air measuring chamber, the end of the second air measuring chamber which is open towards the surroundings must be closed. It is then possible for the first air measuring chamber to be measured, as will be described in more detail in the following, for example by suctioning off air from the first air measuring chamber and from the second air measuring chamber intersecting it in order, for example, to set a defined low pressure in the two air measuring chambers. If the first and second air measuring chambers are intact, i.e. if, for example there are no cracks running through them, a defined low pressure can be adjusted and no air compensation takes place.

In the example of FIG. 1, a crack 20 or fracture runs in the core arrangement 16 between the two adjacent, parallel air measuring chambers b2 and b3. To determine the crack 20, air is then pumped, for example, into air measuring chamber b2 to set a predetermined measuring chamber pressure $P_{measuring\ chamber-b2}$ which is higher than the ambient pressure $P_{ambient}$. Likewise, it is also possible instead for a predetermined low pressure to be produced in air measuring chamber b2, as described previously with respect to air measuring chamber a2.

However, due to the crack 20 which runs between the two air measuring chambers b2 and b3, the predetermined excess pressure does not form in air measuring chamber b2. Instead, the air which is pumped into air measuring chamber b2 to produce the excess pressure is released or removed outwards via the crack 20 and air measuring chamber b3. To then determine the length or extent of the crack 20, air is, for example, either pumped into the adjacent air measuring chamber b1 or is suctioned out of said air measuring chamber b1 to produce a low pressure in air measuring chamber b1. Since the crack 20 does not extend up to air measuring chamber b1, a defined low pressure forms in air measuring chamber b1 during the production of a predetermined low pressure by the measuring system, because air measuring chamber 18 is intact and is virtually sealed such that no air can be drawn in by suction from the surroundings, for example due to a crack 20, which would result in a pressure compensation. Thus, the evaluation means can establish in step S3 that the crack 20 or fracture in the core arrangement 16 extends between the two air measuring chambers b3 and b2, but not as far as air measuring chamber b1.

In principle, it is true that with undamaged structures and thus undamaged air measuring chambers 18, the set pressure $P_{measuring\ chamber}$ in measuring chamber 18 can be kept constant or substantially, that is, almost constant and the measuring system does not determine any substantial change in the pressure or a differential pressure.

Where there is damage, caused for example by cracks 20 in the core arrangement 16, ageing phenomena such as porosities which occur etc., or delaminations 22 (debonding) or separation phenomena, there is a change in pressure in the corresponding air measuring chamber 18 due to a pressure compensation. In other words, if an air measuring chamber 18 and its adjacent air measuring chamber 18, for example air measuring chambers a1 and a2 or b2 and b3 in FIG. 1, lead through a damaged area 28 such as a fracture 20 or a delamination 22, a pressure compensation results in the corresponding air measuring chamber 18, where the measuring system sets a higher or lower measuring chamber pressure than ambient pressure. This means that in step S2 it is established that air measuring chamber 18 substantially assumes the ambient pressure or that a pressure compensation results in this measured air measuring chamber 18.

To two-dimensionally monitor sandwich components 10, air measuring chambers 18 are provided for example in the form of channels, as shown in FIGS. 1 and 2. The air measuring chambers 18 or channels are introduced, for example in a defined spacing relative to one another in the core arrangement 16 or in the present foam core. The mutual spacing of the air measuring chambers 18 can be determined, for example by the extent, to be expected, of the defects or damaged areas 28 to be detected. In other words, if defects such as delaminations with a diameter of, for example, at least 1 cm are to be detected, as shown in FIG. 1, two adjacent air measuring chambers 18 must be in a spacing of at the most 1 cm. If their spacing is greater than 1 cm, delaminations 22 of this type with a diameter of 1 cm can no longer be detected. This is, however, merely an example to explain the choice of spacing of adjacent air measuring chambers 18. In principle, the spacing between adjacent air measuring chambers 18 can be as great or as small as desired, i.e. greater or smaller than 1 cm, depending on whether large or even very small defects are to be detected. The size of 1 cm is purely an example and the invention is in no way restricted thereto.

The mutual spacing of the air measuring chambers 18, the configuration, orientation and/or positioning of the air measuring chambers 18 can be varied as desired, from one air measuring chamber 18 to another. In particular, the mutual spacing of the air measuring chambers 18, the configuration, positioning and/or orientation of the air measuring chambers 18 in the case of at least two, more or all air measuring chambers 18 can, for example, be selected to be respectively the same or different, depending on function and purpose of use. Furthermore, the grid formed by the air measuring chambers 18 can be varied as desired, for example it can be in a reticulated configuration with angular, circular and/or star-shaped fields, etc., to name but a few examples.

The diameter of the air measuring chambers 18 or channels is, for example, equal to or less than 1 mm. However, in principle the diameter can also be selected to be greater than 1 mm, depending on function and purpose of use. The diameter of the air measuring chambers 18 or channels is likely to be selected to be smaller, for example in the case of rather thin-walled sandwich elements 10 in aircraft construction. For thick sandwich components 10 with a thickness of, for example, 10 cm or with even a significantly greater thickness, it is of course also possible in principle for significantly greater diameters to be selected for the air measuring chambers 18. The range of equal to or less than 1 mm is merely an example and the invention is not restricted thereto. Finally, any diameter can be selected for the air measuring chambers 18 or channels, provided, for example, that the operability of the sandwich structure 10 to be examined is not impaired, or is not substantially impaired thereby.

The air measuring chambers 18, for example in the form of channels, can be provided in the same direction and/or at the same angle in three-dimensional space in the core arrangement 16 or can be introduced into the core arrangement 16 or into the present foam core in different directions and/or at different angles in three-dimensional space.

FIGS. 1 and 2 are merely two examples of providing air measuring chambers 18 in three-dimensional space of the core arrangement 16.

FIG. 2 shows a further embodiment of the invention. In this case, a sandwich component 10 is also provided to be examined for defects. The sandwich component 10 in FIG. 2 is constructed in the same way as that in FIG. 1, for example, and has a first layer and a second layer or an upper cover layer 12 and a lower cover layer 14, consisting for example of a fibre-reinforced plastics material, such as CFRP. Provided between the two layers 12, 14 is a core arrangement 16 consisting of a closed-pore and/or open-pore foamed material, for example a plastics material foam and/or a metal foam. The two cover layers 12, 14 are attached to the core arrangement 16, for example by adhesive bonding.

To examine the sandwich component 10 for defects, air measuring chambers 18 are provided, for example in the form of channels in at least one or, according to the present embodiment, in a plurality of planes 30, for example orthogonally to a cover layer 12, 14.

The air measuring chambers 18 also form, for example, a grid, for example a grid network. In principle, air measuring chambers 18 can be positioned as desired relative to one another and, in this respect, some or all the air measuring chambers 18 can be positioned regularly or irregularly relative to one another and can form any grid shapes or grid arrangements. FIGS. 1 and 2 show merely two examples of the arrangement and the grids of the air measuring chambers 18.

Instead of running parallel to a cover layer 12, 14, as shown in FIG. 1, the air measuring chambers 18 or channels in FIG. 2 can, for example, also run orthogonally to a respective cover layer 12, 14. Some or all the air channels 18 can extend over the entire width of the sandwich component 10, i.e. from one cover layer 12 to the other cover layer 14, such that for example delaminations 22 can also be detected between a cover layer 12 and the core arrangement 16. In principle, however, some or all the air channels 18 can also only run over a partial region of the width of the sandwich component 10, i.e. for example from one cover layer 12, 14 up to the centre of the core arrangement 16.

In the example shown in FIG. 2, a delamination region 22 extends between the two air measuring chambers A1 and A2. In this case, for example, air measuring chamber A1 is measured. For this purpose, for example, air is suctioned out of air measuring chamber A1 to produce a defined low pressure (step S2). In so doing, the measuring system establishes that a pressure compensation has resulted in air measuring chamber A1, because air measuring chamber A1 leads through the delamination area 22. To then ascertain how large the delamination area 22 is or how far it extends, the adjacent air measuring chamber A3 (step S2), for example, is then measured and, for example, air is suctioned out of air measuring chamber A3 by the measuring means to produce a defined low pressure. In so doing, the measuring means establishes that the defined low pressure can be set in air measuring chamber A3 and no pressure compensation takes place. Furthermore, the adjacent air measuring chamber A2 (step S2) is subjected to a low pressure by the measuring means, but in this case a pressure compensation results because air is drawn in by suction through the adjacent air measuring chamber A1 and the delamination area 22 which connects both air measuring chambers A1 and A2. Therefore, the evaluation means can establish (step S3) that the delamination area does extend between the two air measuring chambers A1 and A2, but does not extend as far as air measuring chamber A3.

In addition, the grid, as shown in FIG. 2, can be divided up into a plurality of square fields. The square fields, for example the field in FIG. 2, have in their corners a respective air measuring chamber 18 or according to the present embodiment a channel F1, F3, F5, F7 and between the two corners a respective air measuring chamber 18 or according to the present embodiment a channel F2, F4, F6, F8 and in the centre an air measuring chamber 18 or according to the present embodiment channel F9. The air measuring chamber F9 is then measured by the measuring system, for example air being suctioned out of air measuring chamber F9 to produce a predetermined low pressure in air measuring chamber F9. The measuring system detects that a pressure compensation is not taking place, but the predetermined low pressure can be produced or set in air measuring chamber 18. The evaluation means can conclude therefrom that there is no damage or damaged area 28, for example a delamination area or a crack, between air measuring chamber F9 and the other air measuring chambers F1-F8 of the field.

Furthermore, it is then possible, for example, for an air measuring chamber F8 to be examined which is located between two corners of the field. In this respect, the measuring system can likewise set a predetermined low pressure in air measuring chamber F8. However, the measuring system detects that a pressure compensation results in air measuring chamber F8 and a predetermined low pressure cannot be set. From this, the evaluation means can in turn establish that the sandwich component has a defect in the region of air measuring chamber F8 and in at least one adjacent air measuring chamber F7, F6, F1, F2, A2, B6, B9.

To check which air measuring chamber 18 the crack 20 or fracture runs through or along in the core arrangement 16, air measuring chamber F7, for example, is examined. During the examination, the measuring system again pumps air out of air measuring chamber F7, for example, to produce a low pressure in air measuring chamber 18. However, since the crack 20 runs between air measuring chamber F7 and air measuring chamber F8, a pressure compensation takes place in air measuring chamber F7 due to the crack 20, i.e. a low pressure cannot be set in air measuring chamber F7. Furthermore, air measuring chamber F1 can optionally also be checked and the measuring means can produce a low pressure there. However, since the crack 20 does not extend as far as air measuring chamber F1 and this chamber is intact, a defined low pressure can be produced in air measuring chamber F1 without a pressure compensation taking place. If the crack 20 were to extend as far as air measuring chamber F1, it would be impossible for a defined low pressure to be set.

From the measurement results, the evaluation means concludes that a crack 20 or a fracture runs between air measuring chambers F7 and F8, although the crack does not extend as far as air measuring chamber F1.

Figure 3:
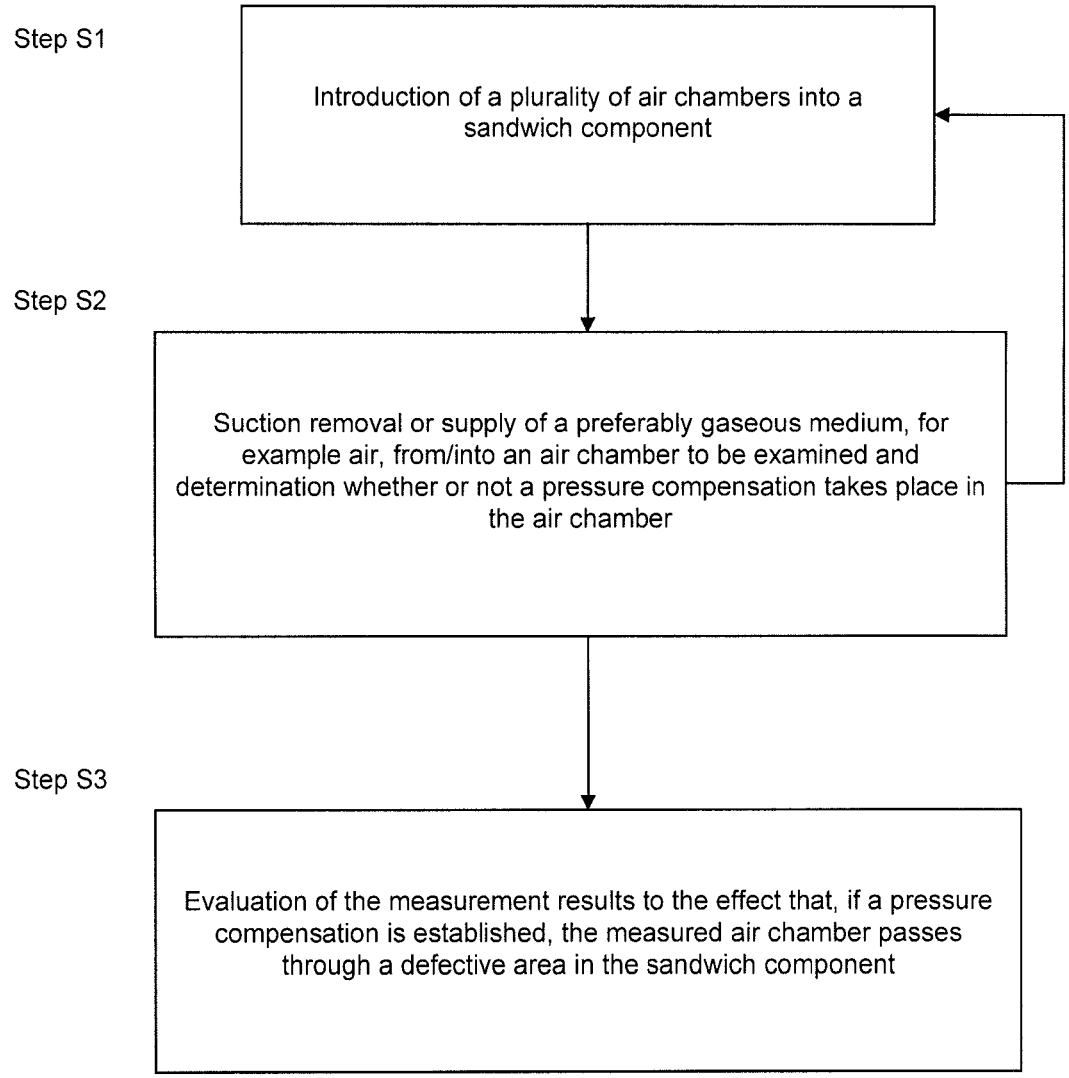
FIG. 3 shows a schematic flow chart for detecting defects in a sandwich structure.

FIG. 3 shows an example of a flow chart according to an embodiment of the method according to the invention for determining or detecting a defect in a sandwich component.

In a first step S1, at least one or more air measuring chambers are initially introduced into a sandwich component to be examined. The air measuring chambers are preferably configured to be open to the surroundings at only one end. The air measuring chambers can, for example by a laser beam, be provided in the core arrangement of the sandwich component, for example a foamed material core and/or a honeycomb core, or they can be lasered, for example, into the core arrangement of the sandwich component through a cover layer.

In the next step S2, a measuring means is connected to the open end of a first air measuring chamber and, as previously described, the air contained in said first air measuring chamber is, for example, suctioned out to set a predetermined low pressure in the first air measuring chamber. If the first air measuring chamber is intact, the measuring means can measure the presence of the defined low pressure. However, if the first air measuring chamber is damaged, for example because a crack runs through the first air measuring chamber and another, second air measuring chamber, then air is also drawn up by suction from outside through the other, second air measuring chamber due to the crack, when the low pressure of the first air measuring chamber is applied. This means that a defined low pressure does not form in the first air measuring chamber. Instead, a pressure compensation takes place in the first air measuring chamber, which can be detected by the measuring system.

In a third step S3, based on the results from the measuring system, an evaluation means is able to determine that there must be a damaged area, for example a crack, due to the pressure compensation and the undefined low pressure in the first air measuring chamber.

Figure 4:
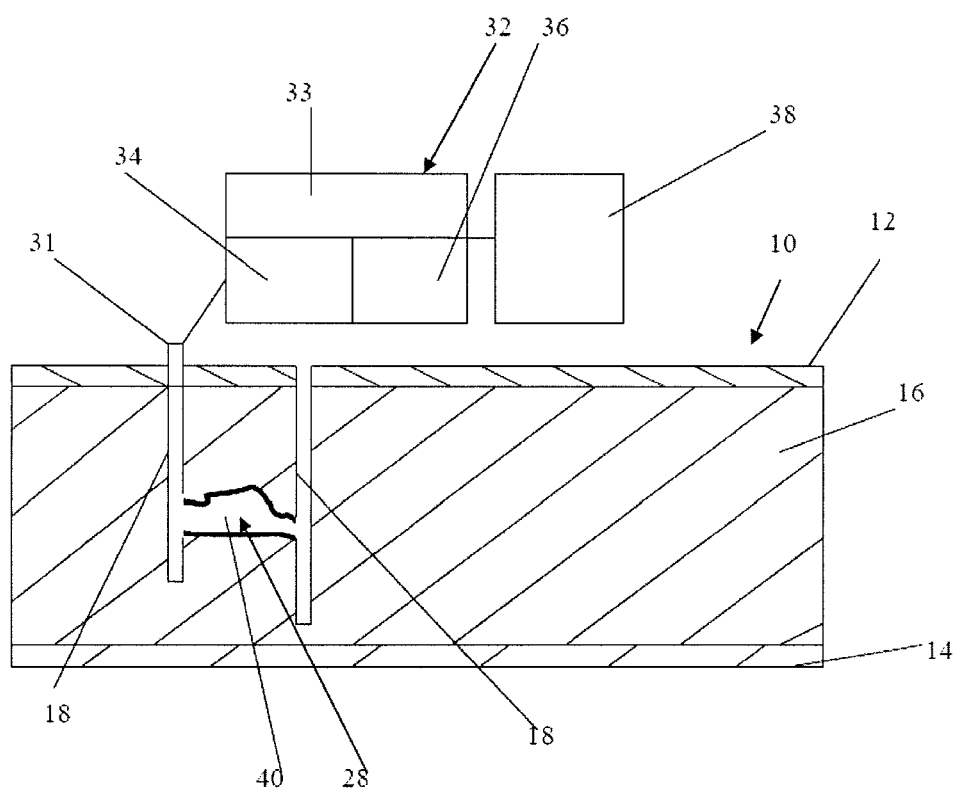
FIG. 4 is a schematic illustration of a detection device for detecting defects in a sandwich structure.

Furthermore, FIG. 4 is a schematic and greatly simplified view of a detection device 32 according to the invention for determining a defect in a sandwich component 10.

The sandwich component 10 has, for example, a core arrangement 16 made, for example, of foamed material and/or a honeycomb structure, a respective cover layer 12, 14 being provided on at least two sides of the sandwich component 10. Connected to a first air measuring chamber 18 to be measured is the detection device 32 which has a measuring system 33. Furthermore, the detection device 32 has, for example, a pump means 34 for suctioning up, for example, air from air measuring chamber 18 and/or for supplying air into air measuring chamber 18. The detection device 32 also has a sensor means 36 for detecting pressures and/or differential pressures in air measuring chamber 18. Furthermore, an evaluation means 38 is provided in which the measurement results of the measuring system 33 of the detection device 32 are evaluated and output. In the present example, a damaged area 28, for example a porosity 40, runs between the first and a second air measuring chamber 18. If, for example, air is pumped out of air measuring chamber 18 by the pump means 34 to produce a defined low pressure, air is drawn up by suction from the surroundings or from outside through the porosity and the second outwardly open air measuring chamber 18 such that a defined low pressure does not result, but a pressure compensation occurs in the first air measuring chamber 18. This is detected by the sensor means 36 of the detection device 32 and is evaluated by the evaluation means 38. The evaluation means 38 establishes that the aforementioned pressure compensation has occurred and that a damaged area 28 must be present in the first air measuring chamber 18. The evaluation means 38 and/or the pump means 34 can be configured as part of the measuring system 33 or can be coupled with the measuring system 33.

For an online monitoring procedure of a sandwich component, the detection device 32 can be provided with the measuring system 33, the pump means 34 and the sensor means 36, as well as the evaluation means 38 in the aircraft. For an offline monitoring procedure of the sandwich component, either the evaluation means 34 can be provided on the ground and at a later stage can be connected to the sandwich component in the aircraft or to the detection means, or the detection means 32 can additionally be provided with the pump means 34 and the sensor means 36 on the ground or in the aircraft, depending on function and purpose of use.

Although the present invention has been described here on the basis of preferred embodiments, it is not restricted thereto, but can be modified in many different ways.

Instead of holes in the form of channels, holes can also be provided in the form of, for example, round, oval and/or square air chambers, to name but a few of many further examples. The shape of the air channels can be varied as desired, depending on function and purpose of use. It is possible to make a qualitative statement about the location of the damage by establishing or detecting the air measuring chambers or, in this case, the channels in which the pressure changes due to defects.

In conclusion, the detection method according to the invention and the corresponding detection means for determining or detecting damage or defects in a sandwich structure affords the possibility of constantly monitoring a core arrangement of a sandwich structure. Core malfunction and debonding can be detected and localised very easily without further procedures and even during operation of the aircraft, i.e. advantageously in flight operation or also when the aircraft is on the ground, for example during inspection and maintenance operations.

LIST OF REFERENCE NUMERALS

10 sandwich component
12 first, upper cover layer
14 second, lower cover layer
16 core arrangement
18 air measuring chamber
20 crack
22 delamination
24 upper side
26 lower side
28 damaged area
30 plane
31 connection
32 detection device
33 measuring system
34 pump means
36 sensor means
38 evaluation means
40 porosity

The invention claimed is:

1. A method for detecting a defective sandwich component in aircraft construction, wherein the method comprises the following steps:
   forming at least one measuring chamber in a core arrangement of a sandwich component, wherein the sandwich component comprises two cover layers and the core arrangement comprising a core, wherein the at least one measuring chamber having a closed end and another outwardly open end;
   connecting a detection device with the open end of the measuring chamber;
   subjecting the at least one measuring chamber with a predetermined pressure by means of the detection device; and
   detecting and evaluating the pressure which forms in the at least one measuring chamber by means of the detection device, a passage of the at least one measuring chamber within a damaged area in the core of the sandwich component being detected if the predetermined pressure does not form in the at least one measuring chamber; or
   a passage of the at least one measuring chamber within an intact region of the core of the sandwich component being detected if the predetermined pressure forms in the at least one measuring chamber.

2. The method according to claim 1, wherein a predetermined low pressure or a predetermined excess pressure is produced as the predetermined pressure in the at least one measuring chamber.

3. The method according to claim 1, wherein the at least one measuring chamber is configured as a measuring chamber filled with a gaseous medium.

4. The method according to claim 3, wherein the at least one measuring chamber is configured as an air measuring chamber.

5. The method according to claim 1, wherein at least one or more measuring chambers are configured between the core arrangement and a cover layer of the sandwich component and/or inside the core arrangement.

6. The method according to claim 1, wherein the at least one measuring chamber is configured in the core arrangement by a heatable element, by lasing, etching, drilling, milling, chemical melting and/or by inserting and subsequently removing a profiled part.

7. The method according to claim 6, wherein the at least one measuring chamber is configured in the core arrangement, wherein the core arrangement of the sandwich component comprises as a core a foamed material core, a metal foam core and/or a honeycomb core.

8. The method according to claim 6, wherein the heatable element is an electrically heatable wire or a small electrically heatable tube.

9. A device for detecting a defective sandwich component in aircraft construction, with a detection device which comprises:
    a pump means for producing a predetermined pressure in at least one measuring chamber of a core arrangement of the sandwich component, wherein the pump means can be connected to an outwardly open end of the at least one measuring chamber, and wherein the other end of the measuring chamber is closed; and
    a measuring system for detecting and evaluating the pressure which has formed in the at least one measuring chamber wherein the measuring system has an evaluation means or can be coupled therewith, the evaluation means detecting a passage of the at least one measuring chamber within a damaged area of a core of the core arrangement of the sandwich component if the predetermined pressure does not form in the at least one measuring chamber, and detecting a passage of the at least one measuring chamber within an intact region of a core of the core arrangement of the sandwich component if the predetermined pressure forms in the at least one measuring chamber.

10. The device according to claim 9, wherein the measuring system has a sensor means for determining at least a pressure and/or at least a differential pressure.

11. The device according to claim 10, wherein the sensor means has at least one or more pressure sensors.

12. The device according to claim 9, wherein the pump means produces a low pressure or an excess pressure in the at least one measuring chamber as the predetermined pressure.

\* \* \* \* \*